United States Patent
Lee

[15] 3,676,772
[45] July 11, 1972

[54] METALLIC INTRUSION DETECTOR SYSTEM

[72] Inventor: Robert D. Lee, San Mateo, Calif.

[73] Assignee: The United States of America as represented by the Administrator of the National Aeronautics and Space Administration

[22] Filed: Aug. 18, 1970

[21] Appl. No.: 64,709

[52] U.S. Cl. .............................. 324/41, 340/258
[51] Int. Cl. ........................... G01r 33/00, G01r 33/12
[58] Field of Search ............... 324/41; 340/258, 38; 336/84

[56] References Cited

UNITED STATES PATENTS 3,503,126  3/1970  Faller .................................. 336/84 X

OTHER PUBLICATIONS

Luck et al., "The Prison Gun Detector"; Radio World, Dec. 1936, pp. 50–56.

*Primary Examiner*—Alfred E. Smith
*Attorney*—Darrell G. Brekke, Armand G. Morin, Sr. and John R. Manning

[57] ABSTRACT

A metal detection system comprising an electro-magnetic transmitter with a single transmitting coil and a receiver with a single receiving coil. The receiving coil is coupled to the radiated electromagnetic energy and the receiver generates a signal that may be used to indicate the intrusion into the electromagnetic field of a metallic object, to indicate whether such object is ferrous or non-ferrous, and to indicate the relative size of the metallic object.

2 Claims, 10 Drawing Figures

PATENTED JUL 11 1972

INVENTOR.
ROBERT D. LEE
BY
Darrell G. Brekke
ATTORNEY

INVENTOR.
ROBERT D. LEE

INVENTOR.
ROBERT D. LEE
BY
*Darrell C. Belohe*
ATTORNEY

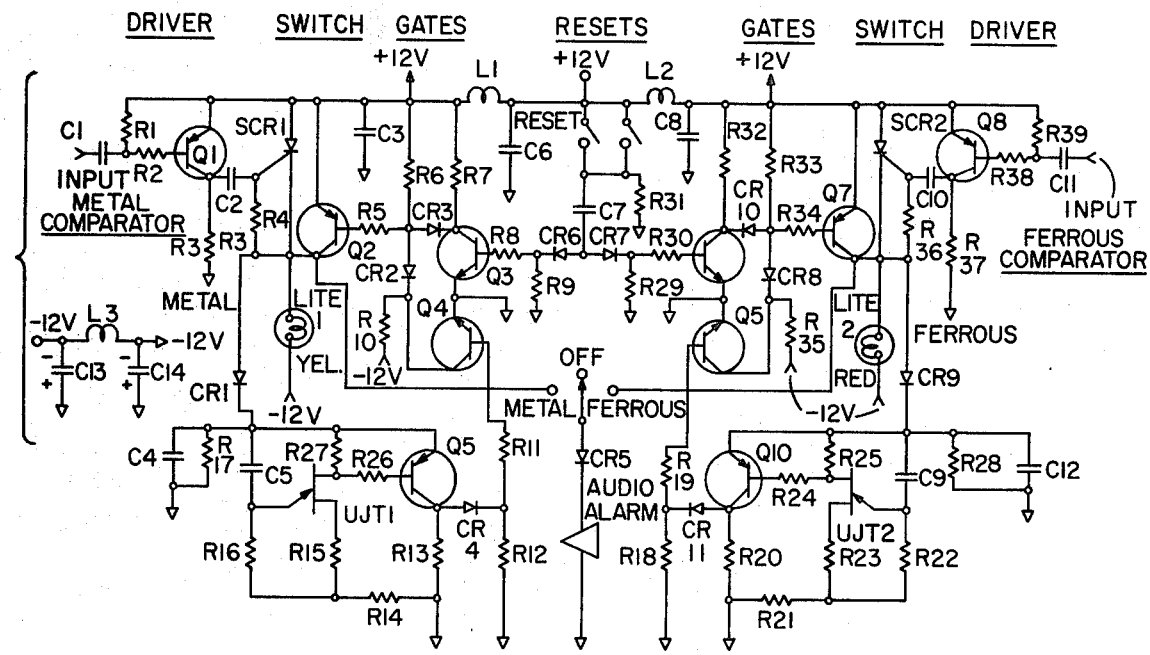
FIG. 9
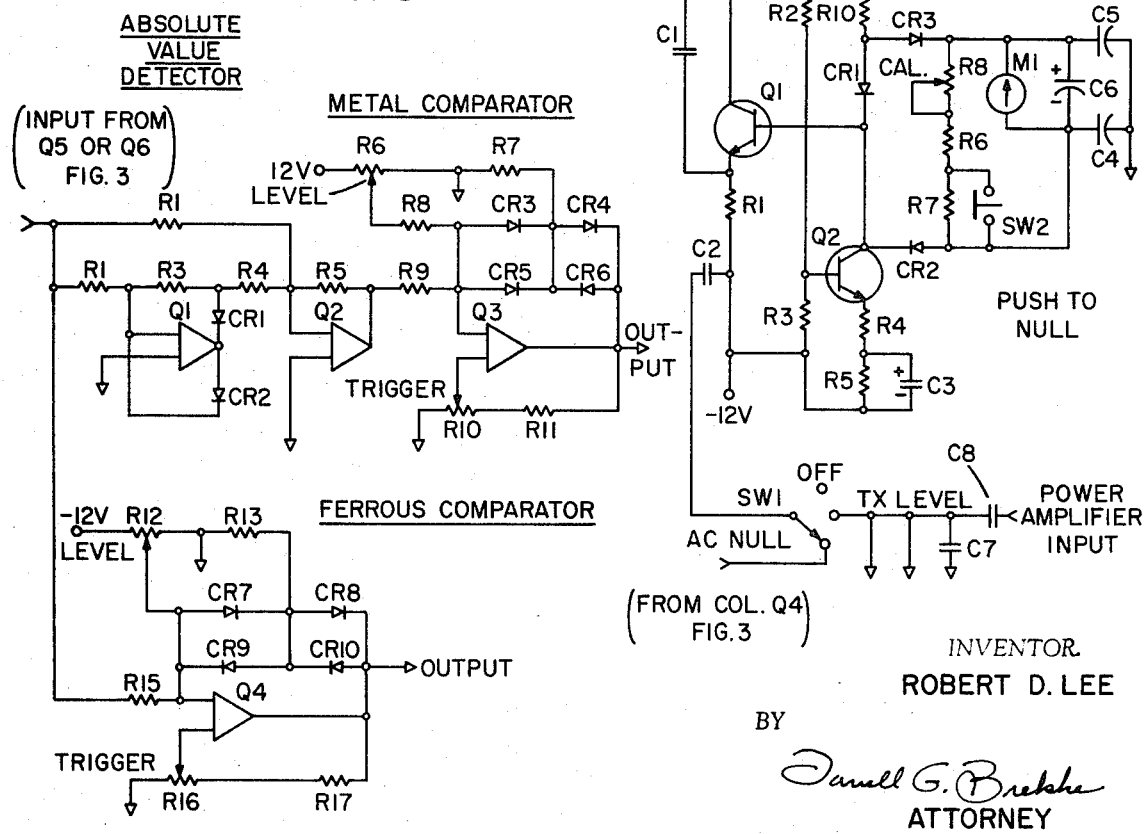
FIG. 8
FIG. 10
INVENTOR.
ROBERT D. LEE

METALLIC INTRUSION DETECTOR SYSTEM

The invention described herein was made by an employee of the United States Government and may be manufactured and used by or for the Government for governmental purposes without the payment of any royalties thereon or therefor.

BACKGROUND OF THE INVENTION

There has long been a need for detecting in real time the fact of intrusion of a metallic object into a space from which such objects are proscribed. Heretofore, systems to accomplish this end have usually utilized magnetometers, but such systems are generally undesirable for the reason that they are capable of detecting only para-magnetic objects (iron, nickel, etc.) and are not affected by the intrusion of non-ferrous metallic objects. Accordingly, it is one of the objects of the invention to provide a real time detection system for metallic objects which will detect both ferrous and non-ferrous objects.

There are many processes, for instance, in manufacturing an food processing, in which the presence of metal objects is undesirable. Under these special circumstances it is important that the system for detection have the capability of alerting attending personnel or initiating automatic means for taking remedial action to remove such metallic objects as are detected. Accordingly, it is still another object of the invention to provide a metal detection system in which the presence of any metal, whether ferrous or non-ferrous, is detected and which incorporates control means for immediately signifying the presence of such metal so that remedial action may be taken.

There has been a continuing need for a system that can secretly effect surveillance of people passing a checkpoint to determine if various types of weapons are being smuggled past the checkpoint. Heretofore, X-ray and fluoroscopic systems have been utilized. For these systems to be effective, the person under surveillance generally has to be static. Furthermore, the radiation can be harmful to the subjects. Magnetometer systems have been used, but as indicated above, they are, at most, sensitive to ferrous objects. Metal weapons such as aluminum frame pistols, stainless steel revolvers, etc., can escape detection by a magnetometer. Guns become magnetically polarized when fired. Magnetometers are vector sensitive and a gun even in close proximity to a magnetometer can be oriented so as to present a zero magnetic field to the magnetometer. Accordingly, it is a still further object of the invention to provide a real time detection system effective to detect the presence of a potential metal weapon on a person without indicating the fact that surveillance is being effected, and without in any way being harmful to the subject under surveillance.

BRIEF SUMMARY OF INVENTION

In terms of broad inclusion, the detection system of the invention comprises a transmitter circuit and a receiver circuit including transmitter and receiver coil assemblies arranged to define a space through which a metallic object is expected to pass, and adapted to generate in said space an electromagnetic field of predetermined energy per unit volume, with the receiver coil being coupled to such electromagnetic energy so as to generate in the receiver circuit an appropriate signal that may be used to indicate the intrusion into the electromagnetic field of a metallic object, and to indicate whether such object is ferrous or non-ferrous, and to indicate the relative size of the metallic object.

The transmitter circuit includes an oscillator operating at a selected frequency through a driver amplifier and a power amplifier, the output from the latter being channeled into the transmitter coil to generate the electromagnetic field.

The receiver circuit includes the receiver coil coupled to the electromagnetic field in a manner to generate a predetermined signal in the receiver coil, a balance transformer interposed between the output of the power amplifier of the transmitter and a summing circuit into which the output from the balance transformer and the signal from the receiver coil are channeled in a manner to buck each other to provide a residual voltage which is then channeled into a summing transformer. The summing transformer also receives the output from a nulling circuit activated by a connection to the driver amplifier of the transmitter circuit. The nulling circuit cooperates with the summing transformer to produce a zero output from the summing transformer, which is applied to a band pass amplifier, the output from which in turn is imposed on parallel phase detector circuits effective to detect the phase of the signal generated when an imbalance is introduced into the system by the intrusion of a metallic object into the electromagnetic field between the transmitter and receiver coils. Within the phase detector circuit, the output from the band pass amplifier is compared with a reference output voltage provided by a phase shifter circuit interposed between each of the phase detector circuits and the power amplifier of the transmitter circuit. The outputs from the two phase detector circuits provide twin channels 90° out of phase with each other, each of which is appropriately channeled through a low pass filter amplifier, the output from each of which may be channeled into a utilization or output circuit in the form of a recorder effective to record the amplitude and polarity of an output signal, or in the form of alarm devices such as multicolored lights, buzzers or bells. Appropriate controls are provided so as to sensitize the detection system so that metallic objects normally expected in the space under surveillance will be detected but will be indicated by an amplitude insufficient to energize an alarm signal or other circuit associated with remedial action. Additionally, appropriate controls are provided so that the intrusion of ferrous or non-ferrous metallic objects will be reflected in the output circuits by variations in polarity of the signal.

DESCRIPTION OF DRAWINGS

FIG. 8 is a schematic view of the metallic intrusion display circuit of FIG. 7

FIG. 9 is a detailed schematic view of the control circuit for the detector apparatus.

FIG. 10 is a metallic intrusion detector meter circuit.

DESCRIPTION OF PREFERRED EMBODIMENT

Figure 2:
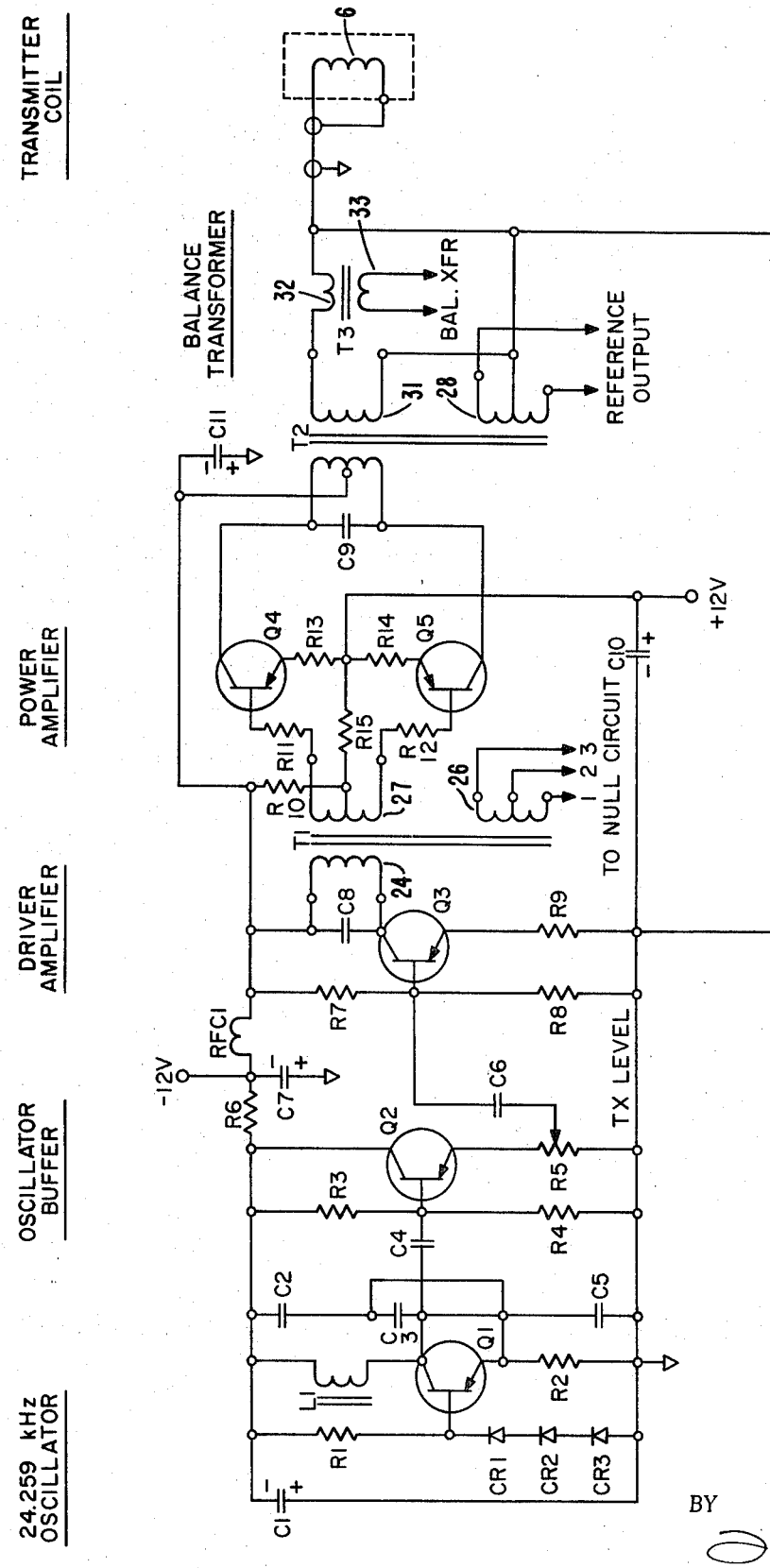
FIG. 2 is a detailed schematic of the transmitter circuit.
Figure 3:
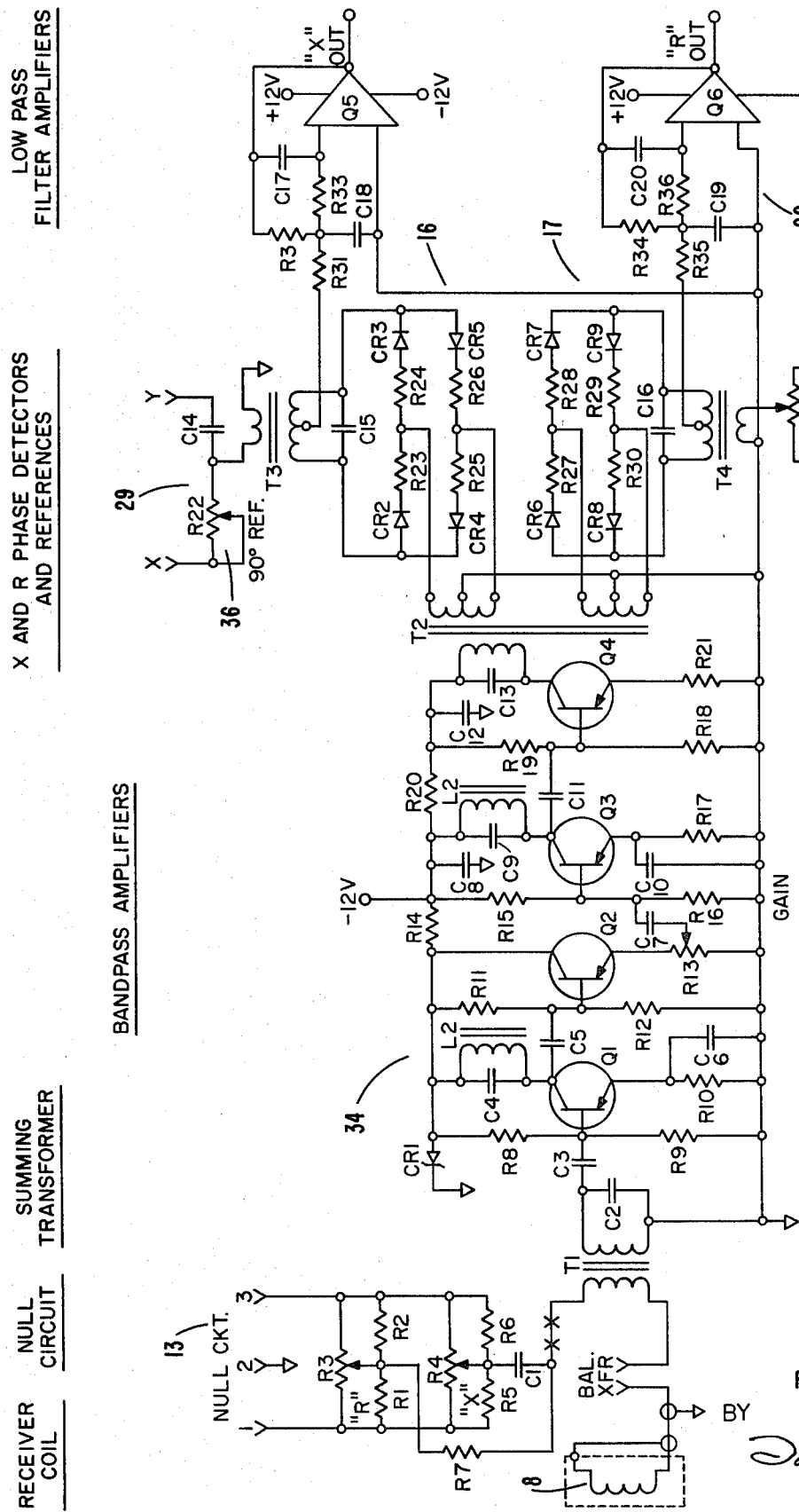
FIG. 3 is a detailed schematic of the receiver circuit.

In terms of greater detail, the metallic intrusion detector system of the invention comprises a transmitter illustrated schematically in FIG. 2, cooperating with a receiver illustrated schematically in FIG. 3. The system as a whole is illustrated in block diagram form in FIG. 1.

Figures 1, 4, 5:
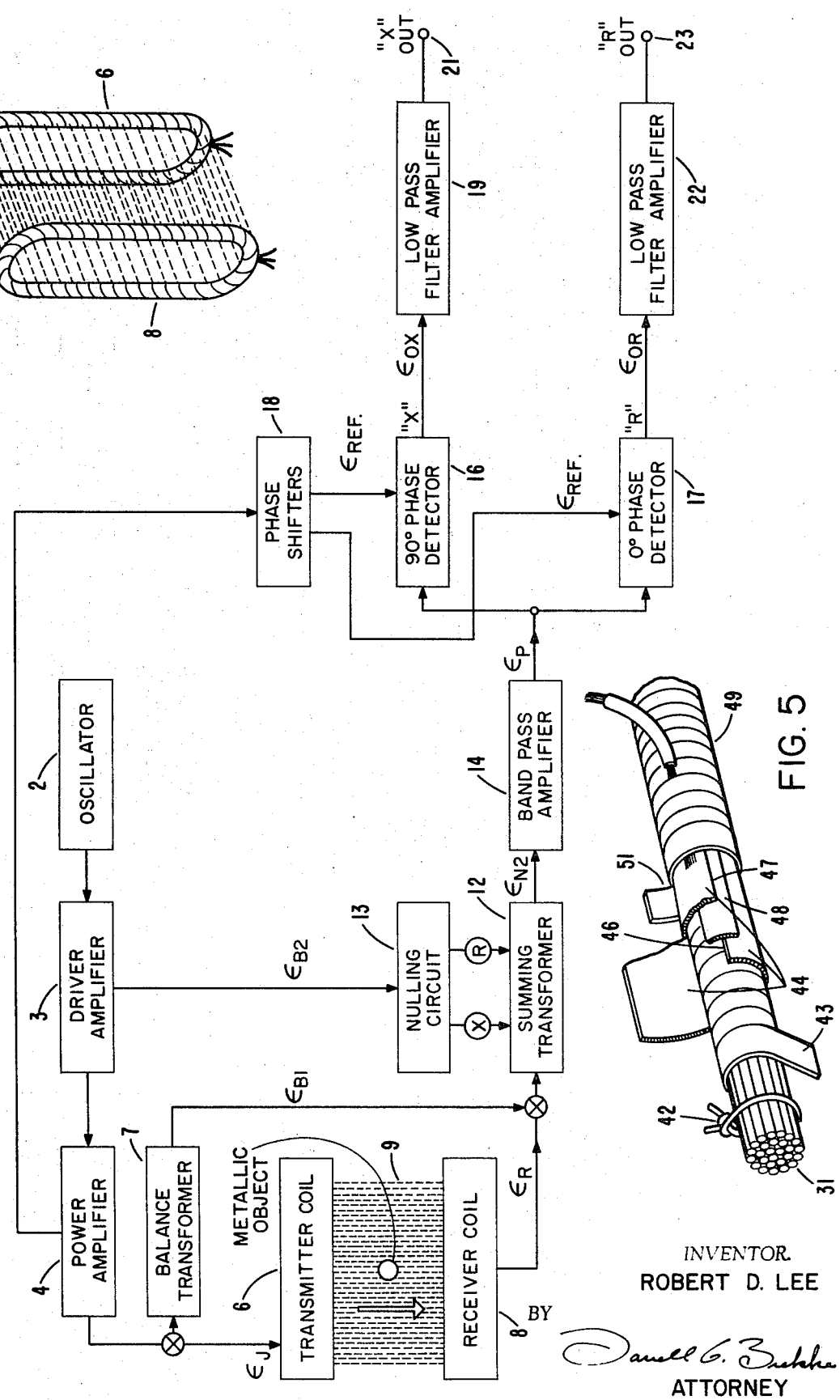
FIG. 1 is a schematic illustration in block diagram form showing the entire system up to the "X" and "R" outputs which may be applied to a utilization circuit.
FIG. 4 is a small perspective view showing schematically an arrangement of transmitter and receiver coils that has proved satisfactory.
FIG. 5 is a fragmentary view illustrating the construction of each of the transmitter and receiver coils.

Referring specifically to FIG. 1, the transmitter portion of the system includes an oscillator 2 the output from which is channeled into a driver amplifier 3, which in turn feeds into a power amplifier 4. One output from the power amplifier is connected to a transmitter coil 6. A balance transformer 7 is connected so that its input potential is at the same level as the potential imposed on the transmitter coil, with the output from the balance transformer being applied to the receiver circuit in a manner which will hereinafter be explained.

The receiver, as illustrated schematically in block diagram form in FIG. 1, includes a receiver coil 9 arranged in electromagnetically coupled relationship to the transmitter coil 6, so as to draw energy from the electromagnetic field 9, thus resulting in the generation of a signal in the receiver coil directly proportional to the energy coupled from the electromagnetic field. The signal voltage generated in the receiver coil is summed with the output voltage from the balance transformer 7, the function of which is to shift the phase of the transmitted signal 180° with respect to the signal voltage generated in the receiver coil. Since the balance transformer is connected in series with the transmitter coil, and since the signal level at the transmitter is somewhat higher than the signal level in the receiver coil, the result of summing these signals is to produce a residual voltage whose amplitude is quite small, the difference being essentially the difference in signal levels between the transmitter and receiver coils.

This residual voltage is applied to the input of a summing transformer 12 which sums such residual voltage against the output from a nulling circuit 13, the input of which constitutes a second balancing voltage derived from the driver amplifier 3. The nulling circuit is interposed between the summing transformer and the driver amplifier, and supplies a second balancing voltage to the summing transformer in the correct phases and amplitude. Complete nulling of the residual voltage with the second balancing voltage derived from the nulling circuit in appropriate phase is controlled through adjustment of suitable potentiometers "X" and "R" as shown.

When intrusion of a metallic object occurs in the electromagnetic field 9, the balance provided by potentiometers "X" and "R" is upset, resulting in an output from the summing transformer. This output of the summing transformer is a nulled voltage having an amplitude near zero which is coupled to a band pass amplifier 14 the center frequency of which is identical to the operating frequency of the oscillator. The output from the band pass amplifier is connected to and drives either one or both of two phase (polarity) detectors 16 and 17, connected in parallel so that the amplified signal from the band pass amplifier constitutes the input for each of the phase detectors. As indicated in FIG. 1, the phase detector 16 constitutes a 90° or "X" detector, while the phase detector 17 constitutes a 0° or "R" detector. Each of the phase detectors receives a reference voltage from a phase shifter 18, the input of which constitutes a signal derived from the power amplifier 4.

Figure 6:
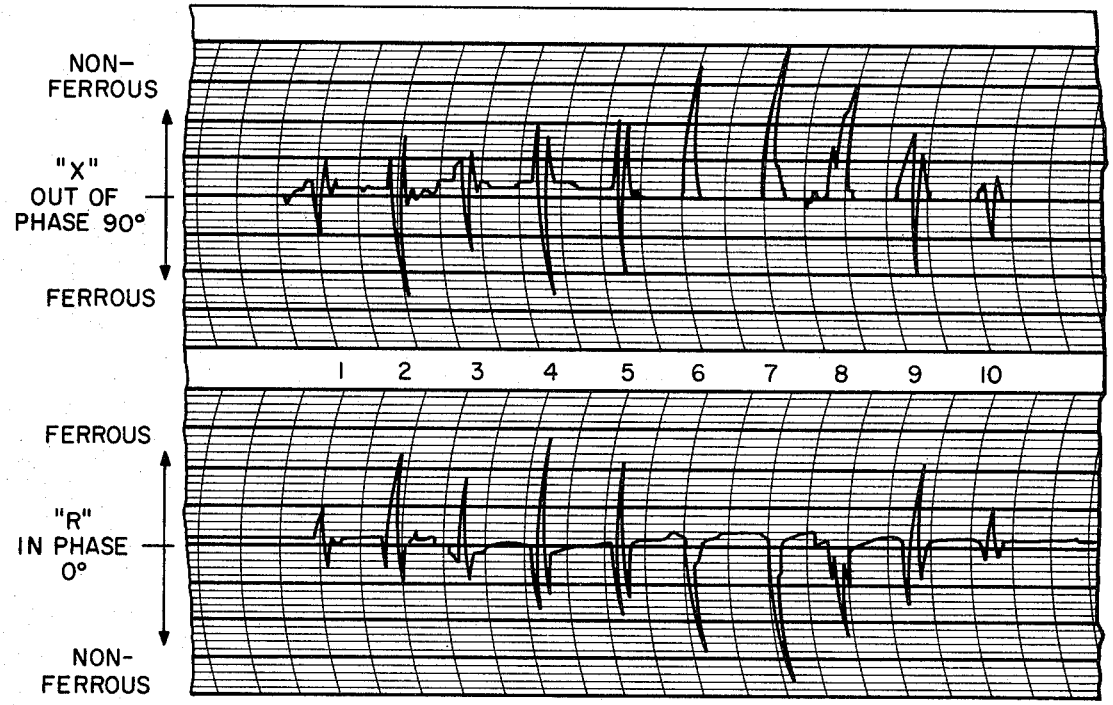
FIG. 6 illustrates a twin-channel trace laid down by a recorder connected to "X" and "R" outputs of the receiver circuit.
Figure 7:
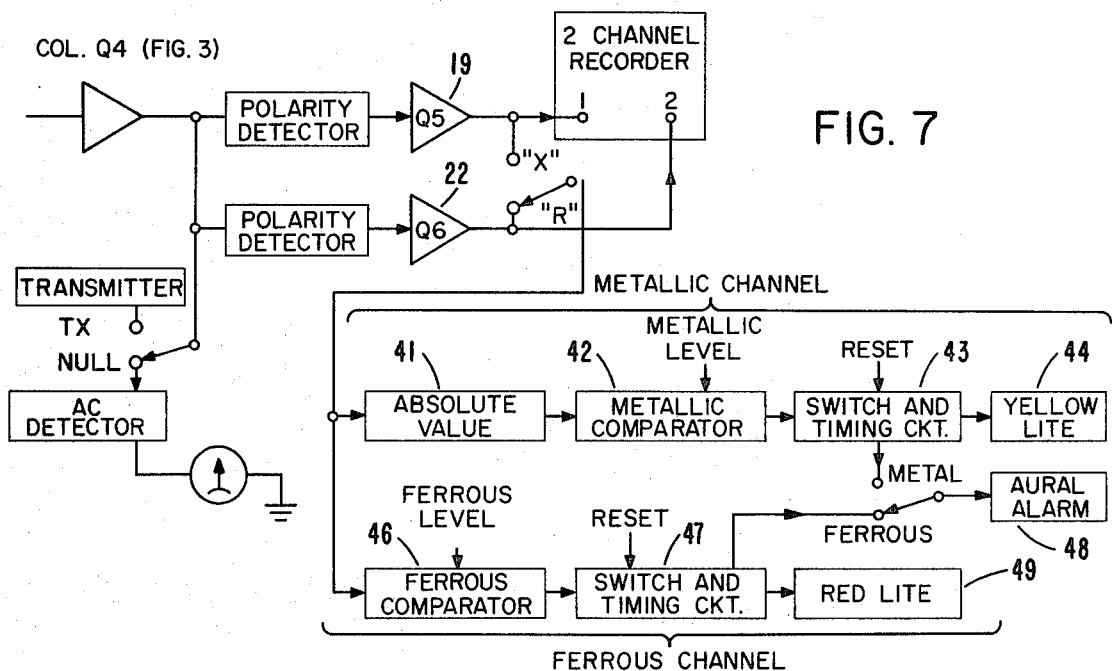
FIG. 7 is a schematic illustration in block diagram form showing a utilization circuit incorporating aural and visual alarms to signify the intrusion of a metallic object into the electromagnetic field.

The output from the 90° phase detector 16 is channeled into a low pass filter amplifier 19, the "X" output terminal 21 of which is appropriately connected to a utilization circuit which forms no part of the present invention but which is illustrated by way of example in FIGS. 7 and 8. Phase detector 17, on the other hand, is connected so that its output is channeled into a low pass filter amplifier 22 having an "R" output terminal 23. It should be noted that the output terminal 21 is correlated to the 90° or "X" phase detector, while the output terminal 23 is correlated to the zero degree or "R" phase detector. For utilization purposes, these output terminals 21 and 23 may be connected for example to a suitable twin-channel recorder (not shown) adapted to lay down a trace such as that illustrated in FIG. 6, or they may be connected to the utilization circuits illustrated in FIGS. 7 and 8.

TRANSMITTER CIRCUIT

Referring specifically to the transmitter circuit illustrated in FIG. 2, the transmitter includes a conventional transistorized oscillator designated Q1, which is conveniently a 24.259 kHz Colpitts oscillator. The frequency of the oscillator is determined by the coil L1 and the two series connected capacitors C2 and C3 which form a parallel resonant circuit. The output of the oscillator is capacitively coupled to the oscillator buffer Q2 through coupling capacitor C4. Stability of the oscillator is insured by bias resistors R3 and R4. The output of the oscillator buffer is taken from its emitter as shown, and the amplitude of the signal is selectively variable by adjustment of potentiometer R5. The adjusted signal is coupled through C6 with the transistorized driver amplifier Q3 which forms part of the power amplifier circuit designated generally in FIG. 1 by reference numeral 4. As shown, resistor R6 and radio frequency choke coil RFC-1 are interposed in the circuit to provide decoupling between the amplifier and oscillator circuits.

The output of the driver amplifier Q3 is taken from its collector terminal and channeled into a parallel tuned circuit tuned to resonance at the base frequency. The parallel tuned circuit includes capacitor C8 and the primary winding 24 of transformer T1; the output of the driver amplifier thus drives the power amplifier circuit.

It should also be noted that part of the output from the driver amplifier Q3 is taken from transformer T1 through an appropriate winding 26 and fed to the "null" circuit designated generally by the numeral 13 shown in the receiver circuit illustrated in FIG. 3. For this purpose, transformer winding 26 is provided with first, second and third taps, the second tap being a center tap to ground.

The power amplifier circuit is energized by the signal induced in transformer winding 27 of transformer T1. This signal is of equal amplitude with the signal in winding 24 of T1 but is of opposite polarity. The signal is applied to drive transistor power amplifiers Q4 and Q5 connected as shown in a push-pull arrangement. The power amplifier is provided with an output circuit comprising a parallel resonant circuit including transformer T2 and capacitor C9.

Energy is coupled from the transmitter circuit to numerous points in the receiver circuit for various purposes. Thus, as previously explained, energy is drawn from the transformer T1 through winding 26 and channeled into the nulling circuit 13. Additionally, a reference voltage is drawn from transformer T2 through winding 28, and applied through appropriate leads (X and Y in FIG. 1) to the amplitude and phase shift network designated generally by the numeral 29 in FIG. 3.

The remaining winding 31 of transformer T2 drives the transmitter coil 6, and also energizes the primary winding 32 of a balance transformer T3 as shown. The secondary winding 33 of the balance transformer is connected to the primary winding of the summing transformer T1 in the receiver circuit as shown.

For a better understanding of the transmitter circuit illustrated in FIG. 2, listed below are the components and their values which have been found to produce satisfactory results.

| CAPACITORS | | RESISTORS | |
|---|---|---|---|
| C1 | 100 µf | R1 | 3.3K |
| C2 | 0.1 µf | R2 | 4.7K |
| C3 | 0.01 µf | R3 | 33K |
| C4 | 0.1 µf | R4 | 15K |
| C5 | 0.1 µf | R5 | 250 ohm |
| C6 | 0.1 µf | R6 | 680 ohm |
| C7 | 100 µf | R7 | 4.7K |
| C8 | 0.18 µf | R8 | 470 ohm |
| C9 | 0.018 µf | R9 | 10 ohm |
| C10 | 100 µf | R10 | 4.7K |
| C11 | 100 µf | R11 | 15 ohm |
| | | R12 | 15 ohm |
| | | R13 | 3.3 ohm |
| | | R14 | 3.3 ohm |
| | | R15 | 100 ohm |

| SEMICONDUCTORS | | REACTORS | |
|---|---|---|---|
| Q1 | 2N4250 | L1 | 4.5mh |
| Q2 | 2N4250 | RFC1 | 2mh |
| Q3 | 2N3789 | | |
| Q4 | 2N3789 | | |
| Q5 | 2N3789 | | |
| CR1–CR3 | 1N914A | | |

RECEIVER CIRCUIT

Referring to the receiver circuit illustrated in FIG. 3, the signal received in the receiver coil 8 from the transmitting coil 6 is connected in series with the balance transformer (T3) reference signal taken from the output of the transmitter power amplifier. The vectorial resultant of these two signals is summed with the signal that results from combining the reference and phase shifted signals delivered from the transmitter driver amplifier 3 (FIGS. 1 and 2) to the receiver "null circuit" 13 (FIGS. 1 and 3). The summing of these four signals in the primary of the summing transformer T1 will result in zero input to the band pass amplifier designated generally by the numeral 34 in the absence of an intrusion of a metallic object between the transmitter coil and receiver coil, provided the "X" and "R" potentiometers of the null circuit 13 are properly adjusted.

The band pass amplifier designated generally by the numeral 34 in FIG. 3 conveniently comprises a conventional tuned, high gain, transistorized amplifier which under normal conditions; i.e., in the absence of intrusion of a metallic object, has a zero output. When a metallic object intrudes into the electromagnetic field between coiled 6 and 8, however, the output of the band pass amplifier is applied to drive a pair of solid state full wave phase detectors 16 and 17, shown schematically in FIG. 1, and shown in diagrammatic detail in FIG. 3. The band pass amplifier is coupled to the phase detector through transformer T2 in a conventional manner.

The phase detectors are of the full wave type and produced a zero output when they receive only the "X"–"Y" reference signals from the transformer T2 of the transmitter power amplifier. As shown, the "X" (90°) detector includes a conventional RC phase shift network comprised of resistor R22 and capacitor C14 in its reference input circuit. A potentiometer 36 is adjustable to provide adjustment of both the phase and amplitude of the input signal. The "R" (0°) detector may be adjusted only in amplitude through selective setting of the potentiometer 37.

The phase detectors, when receiving a signal from the band pass amplifier which combines with the phase shifted reference signal in the detectors, will produce output voltages to the "X" and "R" output terminals of the low pass filter amplifiers 10 and 22. These output voltages are then appropriately applied to the utilization circuits illustrated by way of example in FIGS. 7, 8 and 9.

The receiver circuits shown in FIG. 3 have operated satisfactorily using the following component values:

| CAPACITORS | | RESISTORS | | | |
|---|---|---|---|---|---|
| C1 | 0.001 μf | R1 | 1K | R21 | 1K |
| C2 | 0.033 μf | R2 | 1K | R22 | 25K POT. |
| C3 | 2.2 μf | R3 | 10K POT. | R23 | 20K |
| C4 | 0.033 μf | R4 | 10K POT. | R24 | 20K |
| C5 | 2.2 μf | R5 | 1K | R25 | 20K |
| C6 | 2.2 μf | R6 | 1K | R26 | 20K |
| C7 | 1.0 μf | R7 | Deleted | R27 | 20K |
| C8 | 100 μf | R8 | 150K | R28 | 20K |
| C9 | 0.0082 μf | R9 | 47K | R29 | 2K |
| C10 | 2.2 μf | R10 | 3.3K | R30 | 20K |
| C11 | 2.2 μf | R11 | 270K | R31 | 12K |
| C12 | 100 μf | R12 | 47K | R32 | 120K |
| C13 | 0.001 μf | R13 | 2.5K POT. | R33 | 10K |
| C14 | 0.001 μf | R14 | 2.2K | R34 | 120K |
| C15 | 0.001 μf | R15 | 100K | R35 | 12K |
| C16 | 0.01 μf | R16 | 27K | R36 | 10K |
| C17 | 0.1 μf | R17 | 10K | | |
| C18 | 2.2 μf | R18 | 15K | | |
| C19 | 2.2 μf | R19 | 150K | | |
| C20 | 0.1 μf | R20 | 100 ohm | | |

SEMICONDUCTORS

| $Q_1$–$Q_4$ | 2N4250 |
|---|---|
| $Q_5$–$Q_6$ | ADO-3 |
| CR 1 | 1N4737 |
| CR2–CR9 | 1N914A |

TRANSMITTER-RECEIVER COILS

The transmitter and receiver coils 6 and 8, respectively, illustrated in FIGS. 1, 4 and 5, are identical in design and construction. These coils may conveniently be in the order of 5 feet long by approximately 16 inches wide. Each coil conveniently comprises approximately 25 turns 31 of 19-gauge wire secured in a bundle by a nylon lacing cord 42 tied about the bundle of wire every 2 inches. Wrapped around the bundle of wire so formed is a layer of ½ inch wide thermo-setting polyester tape 43, wound toroidally about the bundle of wire with half of each turn of tape overlapping the previously turn. Preferably, the thermo-setting polyester tape is applied over the nylon ties. Superimposed over the layer of polyester tape is a layer 44 of aluminum foil tape which is applied longitudinally around the coil to form a continuous non-shorting Faraday shield. The foil 44 is wide enough so that edge portions 46 and 47 overlap. The overlapped edge portions are electrically insulated one from the other by a strip of ½ inch wide polyester tape 48. The aluminum foil tape covers the complete coil except where the coil input and shield leads enter the assembly. To retain the Faraday shield in position, there is superimposed over the aluminum tape a layer 49 formed by torroidally winding ½ inch wide glass tape 51 about the aluminum shield so that one-half of each turn of the glass tape overlaps the preceding turn. A Faraday shield input connection or lead 52 is provided by a length of multi-stranded cable from one end portion from which the insulation has been removed as shown. The uninsulated multi-strand wires are flaired and placed in intimate contact with the aluminum foil and the glass tape wound thereabout to retain the lead in position. It will of course be understood that care must be taken in the fabrication of each coil to prevent shorted turns in the Faraday shield. It has been found that a coil constructed as described will have an inductance of approximately 2.245 mh, a "Q" equal to 5.83 at 1 kiloHertz (1 (kHz), and a shield to coil natural resonant frequency of 100 kHz. It has also been found that since the natural resonant frequency of the coil is much greater than the operating frequency of 24 kHz, capacitive changes in the Faraday shield have very little effect on the system.

UTILIZATION MEANS

As indicated above, the output from the "X" and "R" output terminals of the receiver may be applied to a daul-channel recorder, a trace from which is illustrated in FIG. 6. As shown by the legend to the left of the figure, the upper trace was made by signals emanating from the "X" output, while the trace illustrated in the lower channel was made by signals emanating from the "R" output. As previously described, a ferro-magnetic object passing between the two sensor coils 6 and 8 disturbs the electromagnetic field therebetween and causes an increase in the amplitude of the signal generated in the receiver coil 8. This increase in signal amplitude results in an imbalance of the summing voltages in the summing and balance transformers, respectively.

The change in voltage is appropriately amplified and causes the DC voltages of the phase sensitive (polarity) detectors to increase from their ambient DC levels to an amplified level. These positive DC voltages are applied to the low pass filter amplifier, which amplifies the positive DC voltages for application to the utilization circuit in the form of a twin-channel recorder.

With respect to the intrusion of a non-ferromagnetic object between the detector coils, it will of course be understood that such an object absorbs energy from the field and will therefore cause the amplitude of the signal generated in the receiver coil 8 to decrease. As before, this change in amplitude results in an imbalance of the summed voltages in the balance and summing transformers, respectively. This change in voltage, which is 180° out of phase with the reference voltage, is amplified and applied to the phase sensitive (polarity) detectors, with the result that the DC voltages of these detectors are decreased from their ambient DC levels. The low pass filter amplifier filters and amplifies this negative DC voltage and presents it to the output circuit, which may be a twin-channel recorder as illustrated in FIG. 6. It will thus be seen that with respect to intrusion by a ferromagnetic object, the magnitude of the DC voltage change from ambient level to the level presented to the recorder is proportional to the cross-sectional area of the intruding object. The duration of the changed DC signal depends on the time the metallic object disturbs the field between the sensor coils. The signal will return to its ambient DC level when the metallic object has passed from the electromagnetic field.

With respect to non-ferrous metallic objects, identification is accomplished by comparing the output signal with the reference AC voltage. A change of polarity from the reference voltage serves to identify the object as a non-ferrous object.

Referring specifically to FIG. 6, there is there reproduced the output of a twin-channel recorder produced in tests in which a subject passed between the sensor coils carrying various objects calculated to produce a predetermined trace. Each experiment is indicated by the numerals from 1 through 10 on the strip of tape illustrated in FIG. 6, while the identification of the object carried by the subject, correlated to the number of the test, is as follows:

1. Subject with 13 keys, nail clipper, small pocket knife, small 6 inch steel rule, stainless steel wristwatch, 10 quarters, one nickel and two pennies.
2. Steel specimen 3 × 1¾× 1 inches added to objects listed in item 1 above.
3. Steel 8 inch scissors added to objects listed in item 1 above.
4. Steel 12 inches square added to objects listed in item 1 above.
5. Iron pipe with end caps (9½× 1¼inches) added to objects listed in item 1 above.
6. Aluminum cover 5½× 3¼× 0.062 inches, with ¼ inch folded edges added to objects listed in item 1 above.
7. Brass specimen 5½× 4 × ⅜inches added to objects listed in item 1 above.
8. Copper rod 5½× 2 inches added to objects listed in item 1 above.
9. Stainless steel rod 8 × 1 inches added to objects listed in item 1 above.
10. Subject carrying the same objects as listed in item 1 above.

From the traces produced as a result of these experiments, it is clear that the amplitude in experiments 2, 4, 5 and 9 indicates the presence of a relatively large ferromagnetic object. The traces produced by experiments 6, 7 and 8 on the other hand clearly indicate by the change in polarity and by the amplitude of the signal the presence of relatively large non-ferromagnetic objects. Such a trace, if scrutinized at the time the trace is made, clearly provides sufficient information to an operator to warrant a further inquiry or physical search of the subject passing between the sensor coils. Additionally, the trace formed by the recorder forms a useful permanent record for further analysis. The disadvantage of the recorder, either single or twin channel, is that an operator must be in constant attendance to scrutinize the trace as it is being made. To obviate this disadvantage, FIG. 7 illustrates in block diagram form a display system with the metallic intrusion detector system described herein. As indicated in FIG. 7, the display circuit may be used in conjunction with the two channel recorder, and is preferably connected to the output of the low pass filter amplifiers 19 and 22. It should be understood that these utilization circuits form no part of the invention described and claimed herein and are included for information purposes and clarity.

The utilization circuit illustrated in FIG. 7 includes absolute value and metallic comparator circuits 41 and 42, respectively, shown connected in series in a first channel designed to identify an intruding object as either ferrous or non-ferrous, and through appropriate switch and timing circuits 43, energizes an appropriate visual alarm 44, which in this instance, is indicated as a yellow light.

The other channel of the display circuit includes a ferrous comparator circuit 46 set to respond when its input signal exceeds a preset amplitude level, which, for instance, may be correlated to the size of various types of ferrous objects. A switch and timing circuit 47 works in conjunction with the ferrous comparator circuit to activate an aural alarm 48, or a visual alarm 49, here indicated as a red light. In both channels, the timing circuit associated with the switch deactivates the switch, thus returning the display system to a quiescent condition. It will of course be obvious that both channels may be switched to an "ON" condition. Under these circumstances, the visual red signal would indicate the possibility of intrusion by a ferrous object, whereas the visual yellow signal would indicate intrusion of an amount of non-ferrous metal sufficient to warrant inquiry.

The detailed construction of the absolute value, metallic comparator and ferrous comparator circuits is illustrated in FIG. 8. Satisfactory circuits were constructed using the following component values:

CAPACITORS
| | |
|---|---|
| C1 | 100 μf |
| C2 | 100 μf |

RESISTORS
| | |
|---|---|
| R1 | 20K |
| R2 | 20K |
| R3 | 20K |
| R4 | 10K |
| R5 | 10K |
| R6 | 25K POT. |
| R7 | 1K |
| R8 | 10K |
| R9 | 10K |
| R10 | 100K POT. |
| R11 | 1M |
| R12 | 25K POT. |
| R13 | 1K |
| R14 | 10K |
| R15 | 10K |
| R16 | 100K POT. |
| R17 | 1M |

SEMICONDUCTORS
| | | |
|---|---|---|
| Q1, Q2, Q3 and Q4 | — | U5B7741393 |
| CR 1 through CR 10 | — | IN914 |

REACTORS
| | |
|---|---|
| L1 | 10mh |
| L2 | 10mh |

The switch and timing circuits 43 and 47 are illustrated in detail in FIG. 9. Satisfactory circuits have been constructed utilizing components having the following values:

CAPACITORS
| | |
|---|---|
| C1 | 0.1 μf |
| C2 | 300 pf |
| C3 | 100 μf |
| C4 | 22 μf |
| C5 | 3.3 μf |
| C6 | 100 μf |
| C7 | 0.1 μf |
| C8 | 100 μf |
| C9 | 3.3 μf |
| C10 | 180 pf |
| C11 | 0.1 μf |
| C12 | 22 μf |
| C13 | 100 μf |
| C14 | 100 μf |

RESISTORS
| | |
|---|---|
| R1 | 4.7K |
| R2 | 4.7K |
| R3 | 3.9K |
| R4 | 1 K |
| R5 | 4.7K |
| R6 | 4.7K |
| R7 | 4.7K |
| R8 | 10 K |

| | |
|---|---|
| R9 | 10 K |
| R10 | 4.7K |
| R11 | 10 K |
| R12 | 10 K |
| R13 | 1 K |
| R14 | 1.8K |
| R15 | 220 ohms |
| R16 | 560 K |
| R17 | 10 K |
| R18 | 10 K |
| R19 | 10 K |
| R20 | 1 K |
| R21 | 1.8K |
| R22 | 560 K |
| R23 | 220 ohms |
| R24 | 120 ohms |
| R25 | 220 ohms |
| R26 | 120 ohms |

SEMICONDUCTORS

| | | | |
|---|---|---|---|
| R27 | 220 ohms | Q1 | 2N4250 |
| R28 | 10 K | Q2 | 2N3645 |
| R29 | 10 K | Q3 | S15649 |
| R30 | 10 K | Q4 | S15649 |
| R31 | 33 K | Q5 | 2N4250 |
| R32 | 4.7K | Q6 | S15649 |
| R33 | 4.7K | Q7 | 2N3645 |
| R34 | 4.7K | Q8 | 2N4250 |
| R35 | 4.7K | Q9 | S15649 |
| R36 | 1 K | Q10 | 2N4250 |
| R37 | 3.9K | UJT-112. | D5KI |
| R38 | 4.7K | CR1 through CR11—IN 914 | |
| R39 | 4.7K | SCR1 | C106B1 |
| | | SCR2 | C106B1 |

REACTORS

| | |
|---|---|
| L1 | 1 mh |
| L2 | 1 mh |

To operate the metallic intrusion detector, it is necessary to visually monitor the AC "null" to insure that the AC voltage does not saturate the receiver amplifier, thus degrading its performance. The meter circuit illustrated in FIG. 10 is provided to indicate full scale deflection when the AC amplifier Q7 (FIG. 7) is saturated, and to indicate near zero at "null." A satisfactory meter has been constructed using components as follows:

| CAPACITORS | | RESISTORS | |
|---|---|---|---|
| C1 | 0.1 μf | R1 | 10 K |
| C2 | 0.1 μf | R2 | 56 K |
| C3 | 4.7 μf | R3 | 27 K |
| C4 | 0.1 μf | R4 | 1.2 K |
| C5 | 0.1 μf | R5 | 470 ohms |
| C6 | 10 μf | R6 | 56 ohms |
| C7 | 0.022 μf | R7 | 100 ohms |
| C8 | 0.001 μf | R8 | 100 ohms |

| SEMICONDUCTORS | | METER | |
|---|---|---|---|
| Q1–Q2 | S15649 | M1 | 100-0-100 ua |
| Cr1–CR3 | IN914A | | |

In summary, the metallic intrusion detector described herein should be warmed up for a period of at least 10 minutes prior to use so as to secure temperature stabilization of the circuits. After the warm-up period, the operator "nulls" the receiver by adjusting the "X" and "R" potentiometers interposed between the nulling circuit 13 and the summing transformer 12, as illustrated in FIG. 1. When proper adjustment has been secured, the twin-channel recorder is switched on and the strip chart paper drive is also energized. Test samples of ferrous and non-ferrous objects are passed through the electromagnetic field to provide a "signature" which may be compared with traces produced during actual surveillance of subjects passing between the sensor coils.

Having thus described my invention, what is claimed to be novel and sought to be protected by letters patent is as follows.

I claim:

1. In a detector system for detecting the intrusion of metallic objects into a given volumetric space into which metallic objects may be expected to intrude, the combination comprising: a transmitter circuit means energizable to generate in said given volumetric space an electromagnetic field having a predetermined energy level per volume; receiver circuit means coupled to said electromagnetic field and arranged to provide a signal voltage directly related to the energy level per unit volume of said electromagnetic field and an output voltage correlated in amplitude and polarity to said signal voltage whereby intrusion into said volumetric space of a ferrous or non-ferrous metallic object will effect variations in said signal voltage reflected as variations in said output voltage; and output circuit means connected to said receiver circuit means and including means to apply said variations in output voltage to indicate whether an intruding metallic object is a ferrous or non-ferrous object and to indicate whether such intruding metallic object possesses a surface area above or below a predetermined norm; said receiver circuit including:

a. a sensor coil arranged to couple electromagnetic energy from said electromagnetic field to develop said signal voltage in said sensor coil;

b. means for summing said signal voltage with a first balancing voltage of opposite phase to produce a residual voltage of relatively low amplitude constituting the difference in amplitude between the transmitted voltage and the signal voltage;

c. a summing transformer connected to receive said residual voltage;

d. a nulling circuit operatively interposed between said summing transformer and one of said amplifiers and adjustable to sum said residual voltage against a second balancing voltage to produce a null in the output of said summing transformer in the absence of a metallic object in said volumetric space defined between the transmitter and sensor coils;

e. a band pass amplifier connected to the secondary of said summing transformer to receive a signal therefrom when a ferrous or non-ferrous metallic object intrudes into said electromagnetic field;

f. a plurality of phase-sensitive detector circuits connected in parallel to the output of said band pass amplifier; and g. a plurality of phase shifting circuits corresponding in number to the number of said phase-sensitive detector circuits, one of said phase shifting circuits being operatively interposed between an associated phase-sensitive detector circuit and one of said amplifiers in the transmitter circuit means whereby the output from each phase detector is applicable to indicate by virtue of its polarity whether the intruding metallic object is ferrous or non-ferrous.

2. The combination according to claim 1, in which said sensor coil comprises:

a. a plurality of turns of an electrically insulated conductor wound to provide a coil having a generally oval configuration;

b. at least one layer of dielectric material encapsulating said coil turns;

c. a metallic shield wrapped about the coil turns and extending longitudinally thereof so that associated long edges of the shield lie in overlapping spaced relation to form a non-shorting "Faraday" shield about the coil;

d. dielectric means interposed between the overlapped long edges of the metallic shield; and e. a layer of dielectric material encapsulating said metallic shield.

* * * * *